Figure 1:
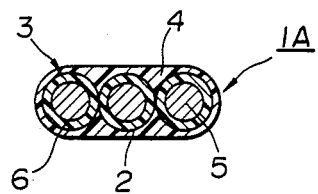

United States Patent [19]

Hanaoka et al.

[11] Patent Number: 4,960,641
[45] Date of Patent: Oct. 2, 1990

[54] STRANDED INSULATED WIRE

[75] Inventors: Kazuo Hanaoka; Sueji Chabata; Michio Koike; Takao Tsuboi, all of Tokyo, Japan

[73] Assignee: Fujikura Ltd., Tokyo, Japan

[21] Appl. No.: 165,847

[22] Filed: Mar. 9, 1988

[51] Int. Cl.⁵ ................. B32B 21/00; B32B 21/08; D02G 3/00
[52] U.S. Cl. .................................. 428/383; 428/379; 428/391; 428/401; 174/120 SR
[58] Field of Search ............... 428/378, 379, 380, 383, 428/375; 174/120 SR, 117 F, 118 R; 524/100, 197, 198

[56] References Cited

U.S. PATENT DOCUMENTS 4,511,624  4/1985  Kawaguchi et al. ............... 428/379

FOREIGN PATENT DOCUMENTS 0212645  3/1987  European Pat. Off. ............ 428/378
42-2385   2/1967  Japan .
56-65053  6/1981  Japan .

*Primary Examiner*—George F. Lesmes
*Assistant Examiner*—J. M. Gray
*Attorney, Agent, or Firm*—Oblon, Spivak, McClelland, Maier & Neustadt

[57] ABSTRACT

A stranded insulated wire and a method of producing the same. The stranded insulated wire is produced by applying a coating material containing polyvinyl butyral and a stabilized polyisocyanate to an enameled strands assembly and then by baking the assembly. The coating material contains about 1 to about 1000 parts by weight of the stabilized polyisocyanate per 100 parts by weight of the polyvinyl butyral.

6 Claims, 1 Drawing Sheet

STRANDED INSULATED WIRE

The present invention relates to a stranded insulated wire in which an assembling layer is formed by coating a resin over an enameled strands stranded assembly.

When such a kind of stranded insulated wire is to be soldered at its one terminal, it is necessary to remove the assembling layer from there to separate enameled strands from each other.

Removal of the assembling layer of the stranded insulated wire is conducted by a method in which a terminal portion of the stranded insulated wire is dipped in an alcoholic solvent to dissolve therein a resin constituting the assembling layer or a method in which the assembling layer is mechanically removed. The method of dipping a terminal portion of a stranded insulated wire in an alcoholic solvent is predominantly employed from the viewpoint of working efficiency and prevention of damage to the insulating layers of enameled strands.

As a resin constituting an assembling layer of a stranded insulated wire, there is used, for example, polyvinyl butyral; a crosslinked resin such as an epoxy resin, polyester, or polyurethane; or polyamide (nylon).

As assembling layer made of polyvinyl butyral is readily soluble in an alcoholic solvent. Thus, strands at the terminal of a stranded insulated wire can be easily separated from each other. However, the assembling layer is swellable or soluble in an alcohol-Freon cleaning solvent, which is used in the cleaning step after incorporating, for example, as a coil in a magnetic head of a disk drive, and hence loses its function.

An assembling layer made of a crosslinked resin such as an epoxy resin is neither swellable nor soluble in an alcohol-Freon cleaning solvent, and is insoluble in an alcoholic solvent. Therefore, the method of mechanically removing the assembling layer must be employed, thus presenting a problem of workability.

An assembling layer made of a polyamide such as nylon 12 is neither swellable nor soluble in an alcohol-Freon cleaning solvent, and is insoluble in an alcoholic solvent, either. It can be dissolved in and removed by a phenolic compound such as phenol or cresol. However, a difficulty is encountered in handling the phenolic compound because of its toxicity.

The present invention provides a stranded insulated wire comprising: an enameled stands assembly including a plurality of enameled strands; and an assembling layer formed over the assembly by coating a coating material, containing polyvinyl butyral and a stabilized polyisocyanate, over the assembly and by baking the coated material for crosslinking, the coating material containing from about 1 to about 1000 parts by weight of the stabilized polyisocyanate per 100 parts by weight of the polyvinyl butyral. The assembling layer is well soluble in an alcoholic solvent and hence separation of the strands from each other can be easily and quickly effected. It is not swellable in an alcohol-Freon during cleaning of the stranded insulated wire after incorporating thereof into an electronic appliance, and hence the cleaning is possible as usual.

Figure 2:
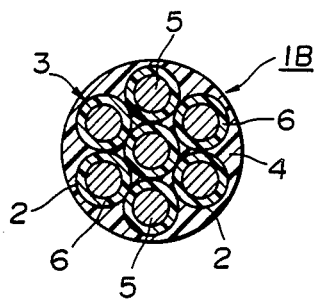

In the drawings:

FIG. 1 is a diagrammatic cross-sectional view of a stranded insulated wire according to the present invention; and FIG. 2 is a diagrammatic cross-sectional view of a modified form of the stranded insulated wire in FIG. 1.

Referring to FIG. 1, the standard insulated wire 1A is produced by bundling three enameled strands 2 in parallel with each other and in a row to form an assembly 3 and covering the latter with an assembling layer 4.

The above-mentioned enameled strand 2 is each produced by coating the surface of a conductor 5 such as an annealed copper wire or a tin-plated annealed copper wire usually having a diameter of about 0.01 to 1 mm with an insulating coating made of polyvinyl formal, polyester, polyurethane, silicone, epoxy, nylon, phenoxy, polyimide, polyester-imide, polyester-amide-imide, polyhydantoin, or polyhydantoin-ester-imide, and baking the coating to form an insulating layer 6 having a thickness of about 0.5 to 10 μm.

The above-mentioned assembling layer 4 is formed by coating the assembly 3 with a coating material containing polyvinyl butyral and a stabilized polyisocyanate and baking the same.

Polyvinyl butyral is obtained by condensation of polyvinyl alcohol with butyraldehyde as follows:

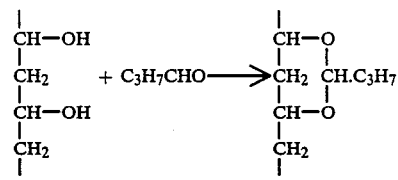

Commercially available polyvinyl butyral having a degree of polymerization of about 300 to about 3,000 and a degree of butyralization of about 70 to about 90 mol% may be used in the present invention although it is not limited within such ranges. Preferably, the polyvinyl butyral has a sufficient amount of hydroxyl groups in a molecular chain which can react with isocyanate groups supplied from a stabilized polyisocyanate as described below.

The stabilized polyisocyanate is a polyisocyanate whose isocyanate groups are temporarily masked with a protective agent such as phenol or an amide to inactivate the same and are regenerated by removing the protective group with the aid of heat or a catalyst according to need. There can be used, for example, a type of compound which is prepared by adding tolylene diisocyanate to trimethylolpropane as a polyhydric alcohol to form a polyisocyanate and protecting the polyisocyanate with phenol. Such a stabilized polyisocyanate is sold under the registered trademark "Desmodur AP Stable" by Bayer, West Germany, or trade designation "Coronate AP Stable" by Nippon Polyurethane Industry Co., Japan (hereinafter N.P.I.). The following stabilized polyisocyanate which is blocked with phenol and is sold under the tradename "Coronate CT Stable" by N.P.I may be also used in the present invention:

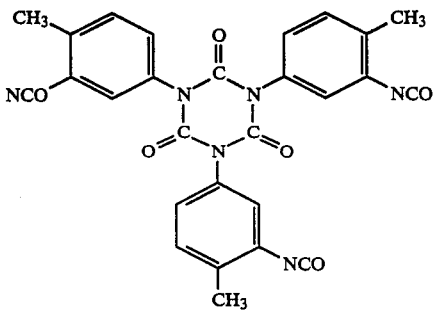

Alternative stabilized polyisocyanate which may be used in the present invention is the following which is obtained by blocking

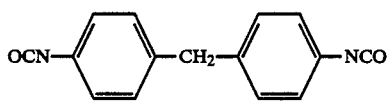

with cresol:

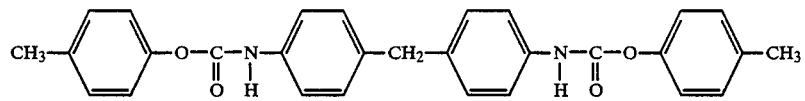

Such a stabilized polyisocyanate is sold under the trade designation "Millionate MS-50" by N.P.I. The stabilized polyisocyanate used in the present invention is not limited to those named above.

In the present invention, the stabilized polyisocyanate is generally used in an amount from about 1 to about 1000 parts by weight, preferably from about 10 to about 300 parts by weight per 100 parts by weight of polyvinyl butyral. When the amount of the stabilized polyisocyanate is less than about 1 parts by weight, the assembling layer is unfavorably swollen in an alcohol-Freon cleaning solvent due to insufficient density of crosslinkage thereof. With more than about 1000 parts by weight of the stabilized polyisocyanate, a difficulty is encountered in dissolving the assembling layer 4 in an alcoholic solvent due to its rather high crosslinking density. Within the preferable range from about 10 to about 300 parts by weight of stabilized polyisocyanate, excellent results in both resistance to the alcohol-freon cleaning solvent and solubility in an alcoholic solvent are achieved.

Polyvinyl butyral and the stabilized polyisocyanate are mixed at the above-mentioned mixing ratio, and may be dissolved in a solvent such as ethanol, butanol, xylene, or cyclohexanone, or a mixed solvent of two or more kinds of them to form a coating material. The resin content of the coating material is typically about 5 to about 40 wt.% but may be outside this range.

This coating material is applied to the assembly 3 and baked to form the assembling layer 4. Application and baking are conducted by using a common apparatus for application and baking of an enamel coating. In the present invention, the baking may be preferably made at a temperature of the baking furnace of about 200 to about 300° C. and with a baking time of about 2 to about 30 sec but it may be carried out outside these ranges.

The density of crosslinkage of the assembling layer 4 thus formed is preferably about 30 to about 80% in terms of a gel fraction or gel content although it is not limited to this range.

Although the coating thickness of the assembling layer 4 varies depending on the position in the embodiment in FIG. 1, the thickness of the thinnest part thereof is preferably in a range of about 0.1 to 10 μm for excellent assembling performance and solubility in an alcoholic solvent thereof.

Since the assembling layer 4 of the stranded insulated wire 1 is obtained by applying a coating material containing polyvinyl butyral and a stabilized polyisocyanate to an assembly of enameled strands and baking the same, hydroxyl groups of the polyvinyl butyral react with isocyanate groups of the stabilized polyisocyanate to form a crosslinked structure. Since the density of crosslinkage is in an adequate range, the assembling layer 4 is soluble in an alcoholic solvent. Thus, the assembling layer 4 can be removed by dipping a terminal portion of the stranded insulated wire 1A in the alcoholic solvent to thereby effect separation of enameled strands 2.. from each other. Since the assembling layer 4 is insoluble in an alcohol-Freon cleaning solvent, it will be neither swollen nor dissolved during normal cleaning operation with the alcohol-Freon cleaning solvent.

FIG. 2 shows a modified form of the stranded insulated wire in FIG. 1. This modified wire 1B is obtained by assembling a plurality of enameled strands 2... (seven enameled strands in this case) by concentric laying, bunch stranding, rope lay stranding, or the like to form an assembly 3 and forming an assembling layer 4 on the assembly 3 in the same manner as that of the foregoing embodiment.

The function and effect of the present invention will now be clarified with reference to Examples thereof.

In the following Examples and Comparative Example, polyurethane insulated copper wires having a diameter of a conductor of 0.05 mm and a thickness of a polyurethane insulating layer of 10 μm were used as the enameled strands. Assemblies consisting of three enameled strands arranged in a row were respectively coated with coating materials having various compositions. Baking was conducted under conditions involving a baking furnace temperature of 220° C., a furnace length of 10 m, and a linear velocity of 10 m/min form an assembling layer having a thickness of 4 μm. Thus, stranded insulated wires were produced. Each of the obtained wires was dipped in ethanol (alcoholic solvent) at room temperature to determine the time taken to separate it into three strands. It was dipped also in Freon TMS (an alcohol-Freon cleaning solvent) and washed with the aid of supersonic waves for 3 minutes. The appearance of the assembling layer was observed to examine the resistance to the alcohol-Freon cleaning solvent. The results are given in Tables 1A to 1D.

EXAMPLE 1

The coating material was prepared by dissolving 100 parts by weight of polyvinyl butyral (Denka Butyral 6000C sold by Denki Kagaku Kogyo K.K, Japan) and 80 parts by weight of a stabilized polyisocyanate (Coronate AP Stable) in 2,000 parts by weight of a 1:1 mixed solvent of ethanol and xylene.

EXAMPLE 2

The coating material in this example was prepared on the same conditions as in Example 1 except that Millonate MS-50 was used as the stabilized polyisocyanate instead of Coronate AP Stable.

EXAMPLE 3

The coating material in this example was prepared on the same conditions as in Example 1 except that trifunctional MDI was used as the stabilized polyisocyanate instead of Coronate AP Stable.

EXAMPLE 4

The coating material of this example was prepared on the same conditions as in Example 1 except that Coronate CT Stable was used as the stabilized polyisocyanate instead of Coronate AP Stable.

EXAMPLE 5

The coating material in this example was prepared by dissolving both 100 parts by weight of polyvinyl butyral (Denka Butyral 2000L sold by Denki Kagaku Kogyo K.K, Japan) and 60 parts by weight of a stabilized polyisocyanate (Coronate AP Stable) in 1,000 parts by weight of a 1:1 mixed solvent of n-butanol and xylene.

EXAMPLE 6

The coating material in this example was prepared on the same conditions as in Example 5 except that Millonate MS-50 was used as the stabilized polyisocyanate instead of Coronate AP Stable.

EXAMPLE 7

The coating material of this example was prepared on the same conditions as in Example 5 except that trifunctional MDI was used as the stabilized polyisocyanate instead of Coronate AP Stable.

EXAMPLE 8

The coating material in this example was prepared on the same conditions as in Example 5 except that Coronate CT Stable was used as the stabilized polyisocyanate instead of Coronate AP Stable.

EXAMPLE 9

The coating material in this example was prepared by dissolving both 100 parts by weight of polyvinyl butyral (Denka Butyral 3000K sold by Denki Kagaku Kogyo K.K, Japan) and 100 parts by weight of a stabilized polyisocyanate (Coronate AP Stable) in 1,000 parts by weight of a 1:1 mixed solvent of cyclohexanone and xylene.

EXAMPLE 10

The coating material in this example was prepared on the same conditions as in Example 9 except that Millonate MS-50 was used as the stabilized polyisocyanate instead of Coronate AP Stable.

EXAMPLE 11

The coating material in this example was prepared on the same conditions as in Example 9 except that trifunctional MDI was used as the stabilized polyisocyanate instead of Coronate AP Stable.

EXAMPLE 12

The coating material in this example was prepared on the same conditions as in Example 9 except that Coronate CT Stable was used as the stabilized polyisocyanate instead of Coronate AP Stable.

COMPARATIVE EXAMPLE

The coating material was prepared on the same conditions as in Example 1 except that no stabilized polyisocyanate was used.

As indicated in the Tables, it was confirmed that the assembling layers of wires of Examples 1 to 12 little swelled nor dissolved in the alcohol-Freon solvent.

TABLE 1A

| Example | 1 | 2 | 3 | 4 |
|---|---|---|---|---|
| Separation time (sec) | 90 | 60 | 90 | 90 |
| Appearance after cleaning with Freon TMS | good | good | good | good |

TABLE 1B

| Example | 5 | 6 | 7 | 8 |
|---|---|---|---|---|
| Separation time (sec) | 50 | 40 | 50 | 50 |
| Appearance after cleaning with Freon TMS | good | good | good | good |

TABLE 1C

| Example | 9 | 10 | 11 | 12 |
|---|---|---|---|---|
| Separation time (sec) | 60 | 50 | 60 | 60 |
| Appearance after cleaning with Freon TMS | good | good | good | good |

TABLE 1D

| | Comparative Example |
|---|---|
| Separation time (sec) | 30 |
| Appearance after cleaning with Freon TMS | swollen |

What is claimed is:
1. A stranded insulated wire, comprising:
  (a) an assembly of a plurality of enameled strands, each comprising an annealed copper wire or tinplated annealed copper wire having thereon an insulating coating made of polyvinyl formal, polyester, polyurethane, silicone, epoxy, nylon, phenoxy, polyimide, polyester-imide, polyester-amide-imide, polyhydantoin or polyhydantoin-ester-imide; and
  (b) an assembling layer coating over said assembly of enameled strands, said assembling layer being produced by applying a coating material, consisting essentially of about 100 parts by weight of polyvinyl butyral, and about 1 to 1,000 parts by weight of a stabilized polyisocyanate, to the assembly and then baking said coating material to effect crosslinking.
2. The stranded insulated wire as recited in claim 1, wherein about 10 to 300 parts by weight of stabilized polyisocyanate is used per 100 parts by weight of the polyvinyl butyral.

3. The stranded insulated wire as recited in claim 1, wherein the assembling layer has a density of crosslinkage of about 30 to about 80% in terms of a gel fraction.

4. The stranded insulated wire as recited in claim 3, wherein the coating material contains a solvent selected from the group consisting of ethanol, butanol, xylene, cyclohexanone, and a mixture thereof and contains about 5 to about 40 weight % of both the polyvinyl butyral and stabilized polyisocyanate.

5. The stranded insulated wire as recited in claim 4, wherein the polyvinyl butyral has a degree of polymerization of about 300 to about 3000 and a degree of butyralization of about 70 to about 90 mol%.

6. The stranded insulated wire as recited in claim 5, wherein the thinnest part of assembling layer has a thickness of about 0.1 to about 10 μm.

* * * * *